United States Patent [19]

Hoy

[11] Patent Number: 4,861,386

[45] Date of Patent: Aug. 29, 1989

[54] ENHANCED CLEANING PROCEDURE FOR COPPER ALLOY EQUIPMENT

[75] Inventor: Edgar F. Hoy, Broken Arrow, Okla.

[73] Assignee: Dowell Schlumberger Incorporated, Tulsa, Okla.

[21] Appl. No.: 269,110

[22] Filed: Nov. 9, 1988

Related U.S. Application Data

[63] Continuation of Ser. No. 940,828, Dec. 12, 1986, abandoned.

[51] Int. Cl.⁴ ................................................. B08B 3/00
[52] U.S. Cl. ......................................... 134/27; 134/2; 134/3; 134/28; 134/29; 124/41
[58] Field of Search ....................... 134/27, 28, 29, 41, 134/2, 3

[56] References Cited

U.S. PATENT DOCUMENTS

| | | | |
|---|---|---|---|
| 3,072,502 | 1/1963 | Alfamo | 134/2 |
| 3,447,965 | 6/1969 | Teumae | 134/3 |
| 3,460,989 | 8/1969 | Rusch | 134/2 |
| 3,887,481 | 6/1975 | Korpics | 134/2 |
| 4,184,991 | 1/1980 | Scheurman, III | 252/394 |
| 4,666,528 | 5/1987 | Aerington et al. | 134/2 |

OTHER PUBLICATIONS

Cotton et al., "British Corrosian J.", vol. 2, pp. 1–5 (1967).

*Primary Examiner*—Asok Pal
*Attorney, Agent, or Firm*—S. A. Littlefield

[57] ABSTRACT

There is disclosed a method and additive to be employed in said method whereby the fouling of metal surfaces with copper deposits resulting from acid cleaning of copper alloy surfaces, be they all of the same metallurgy or merely elements within the overall system is markedly reduced by adding to the rinse or flush formulations commonly employed following an acid treatment, a chelating agent for copper, and, subsequently adding a copper corrosion inhibitor to the conventional neutralization fluid.

5 Claims, 5 Drawing Sheets

Fig. 3 Water effluent tests for 90/10 Cu/Ni tubes using two different flush stages.

Fig. 4 Cu profile of start-up water from admiralty heat exchanger cleaned using the enhanced foam cleaning treatment.

Cu profile of start-up water from 90/10 Cu/Ni tube using the HCl acid enhanced foam cleaning treatment.

4,861,386

ENHANCED CLEANING PROCEDURE FOR COPPER ALLOY EQUIPMENT

This is a continuation of co-pending application Ser. No. 940,828, filed on Dec. 12, 1986, now abandoned.

BACKGROUND OF THE INVENTION

Considerable research has been undertaken to determine the mechanics and chemistry of surface corrosion on the water-side of metal equipment in an effort to improve the life of such equipment. Most of the research has centered around the passivation of the surface by treating the water or adding to the service water or as a pretreatment of the metal surfaces prior to contact with the service water, agents found to passivate and/or reduce the redox reactions which occur due to the presence of dissolved gases such as oxygen, carbon dioxide and hydrogen resulting from leaks, as well as, degradation of the water from couple reactions between different metals in the system and the thermal patterns of these metals in service. It has become common practice to remove scale and corrosion product deposits to restore the tubing to near its original diameter and improve surface film flow characteristics. It is also common practice to passivate the metal surfaces including metal deposits which may form during such cleaning procedures, since these deposits can create electrical couples throughout the system dissolving away metal and thus reducing the structural integrity of the tube and/or piping.

It has become standard practice to clean the water-side surface of metal equipment, such as heat exchanger tubes, boiler tubes and the like, by treating the water-side surface with an acid, usually an aqueous acid such as hydrochloric acid, to remove the scale which is deposited from the water and/or results from reaction of the metal surface with the water and/or oxygen during the in-service period of the equipment. This acid treatment is followed by at least one and conventionally two aqueous treatments; one, optional, to flush the acid from the equipment, and the other, to neutralize any residual acid remaining on the surface. Conventionally, this type of cleaning is carried out by providing the treating agents or fluids in the form of a foam, although other techniques may be used, as for example, hydraulic pressure cycles or the like.

It has now been found that present day advanced techniques for cleaning copper alloy metal surfaces leaves the surface lightly fouled with copper precipitates which, if not removed, in time cause corrosion through the bi-metal couple, as well as, creating an environmentally undesirable waste problem during start-up of a just cleaned unit due to the presence of copper in the effluent discharge during the water chemistry passivation of the surfaces when the equipment is placed back in service.

It would therefore be advantageous to the industry if an additive and/or additives could be found which would reduce the presence of copper deposits normally found in acid cleaning of copper alloy surfaces, and, thus reduce, if not eliminate, the presence of copper redeposited and copper in any form in effluent waters from the system. These and other objects will become apparent to those skilled in the art from the following description and examples.

BRIEF DESCRIPTION OF THE INVENTION

In accordance with the present invention, the fouling of metal surfaces with copper deposits resulting from acid cleaning of copper alloy surfaces, be they all of the same metallurgy or merely elements within the overall system, can be reduced and/or eliminated by adding to the rinse or flush formulations following an acid treatment, a chelating agent for copper and subsequently adding a copper corrosion inhibitor to the neutralization fluid.

Suitable chelating agents such as the alkali metal or ammonium salts of poly (di, tri or tetra) alkylene polyamine polyacetic acids, for example 2-hydroxyethylethylenediamine triacetic acid (HEDTA) diammonium ethylene diaminetetraacetic acid ($(NH_4)_2EDTA$), may be used with good results.

The copper inhibitors found most useful are the benzotriazoles, such as the sodium benzotriazole, the mercaptobenzotriazoles, particularly, sodium 2-mercaptobenzotriazole, the tolyltriazoles, such as sodium tolyltriazole, the naphthotriazoles, such as sodium naphthotriazole and the like. While other salts may be used, most are currently uneconomical and not readily available.

Good results are obtained when one of the above chelates is included in the rinse formulations and one of the above noted copper inhibitors is included in the neutralization formulations used in the processes for the removal of deposits and scale normally found in waterside thermal exchanger units of present day copper alloy metallurgy, such as found in condensers of steam generating systems.

Experience has found that good results can be achieved both with respect to performance in reducing the copper deposition and bleed through by incorporating from about 0.1 to about 1% by weight of the chelating agent in the rinse or acid flush formulation and from about 200 to about 1000 parts per million of inhibitor-deactivator in the neutralization formulation. It is of course to be understood that greater amounts of these agents can be employed, but that in most instances it is a waste of these materials since no apparent improvement appears to be obtained.

The pH of formulations into which the chelates are to be added is between about 1 and about 5.5. Prior to addition of the chelate it was found that when the pH of the formulation was above about 5.5 the hydroxide present in the formulations resulted in precipitation of copper. With addition of the chelate it was found that at a pH below about 1 the chelation reaction rate is reduced and that above about 5.5 the hydroxides still compete with the chelation reaction (although not to the extent as when the chelate is absent), each condition reducing the chelating effect for copper, except when the ammonium form of the chelate is employed, then it is possible and readily obtained, to operate at a pH of up to 9 with out loss of chelation effect.

The pH of the formulation into which the inhibitor-deactivator agent is added should be in the range of about 7 to about 8.5. Below about 7 the agents have been found to have lesser solubility in the conventional formulations than at 7, and, above about 8.5 the competition between the copper inhibitor-deactivator as a deactivator and its hydroxide formation is more prevalent.

The temperature of the treatment to flush and neutralize the acid cleaning formulation from the surfaces is not critical, but is preferably between about 80° and 120° F. for the flush and between about 40° and 140° F. for the neutralization step. The lower temperature of the flush treatment not being critical but temperatures much above about 120° F. increase the solubility of copper from the unpassivated surfaces.

While foam cleaning is a present day preferred method for removing the normal deposits from copper alloy tubes, other techniques may be employed with equal success with respect to copper redeposition and/or bleed through by incorporating the aforedescribed additives into the rinse and/or neutralization steps when the temperature and pH ranges aforesetforth are adhered to. When foam cleaning is used it is preferable to have a "foam quality", that is the volume percent of gas in the total gas-liquid composition, between about 65% and about 95%. "Foam quality" below about 65 results in a reduction in the half-life of the foam and a "foam quality" above 95 is too dry to wet the surface and the foam is unstable. Optimal "foam quality" is about 85.

While it is not critical to the invention here disclosed, it has been found advantageous to use about a 15% by weight acid solution inhibited with one or more of the widely used proprietary acid inhibitors and a foaming agent which is stable under the acidic conditions, such as the non-ionic and anionic surfactants.

DETAILED DESCRIPTION OF THE INVENTION

In the following examples:

Standard foam generating equipment is used, i.e., a liquid pump, gas supply with flowmeter and static mixer for mixing the gas with the pressured liquid to generate an 85 "foam quality".

15% hydrochloric acid with about 0.2% of a proprietary acid corrosion inhibitor of the polynuclear nitrogen containing class and 1 vol. % of an acid stable foaming agent (a mixture of non-ionic surface active agents) was used to do the cleaning.

The chelate/flush stage formulation contained in addition to the chelate about 1% of the foaming agent.

The alkaline deactivator step formulation contained in addition to the conventional alkali metal hydroxide, sodium hydroxide, 1000 ppm of the sodium salt of 2-mercaptobenzotriazole and about 1% by weight of the foaming agent.

PROCEDURES

Employing apparatus aligned as illustrated in the drawing, one meter sections of fouled condenser tubes were cleaned using the 85 "foam quality" at a rate of 0.167 meter per second. Samples of the solutions fed to the tubes were taken to insure the additives were within the proper ranges. Samples of the effluent were taken periodically and analyzed for total copper using a Perkin Elmer 5000 atomic absorption spectrophotometer. The acid cleaning step was carried out until the copper concentrate in the effluent acid solutiion approached the copper expected from the base metal corrosion.

The flush step was carried out using the 85 "foam quality" water at a rate of 0.167 meter per second through the tube until the effluent pH approached the pH of the foam to the unit, which in the examples was 4.5. Samples of the effluent were taken peridically and analyzed for copper.

The neutralization step was carried out using an aqueous alkali solution of the same "foam quality" and rate as the flush step. The treatment was continued for about five minutes duration after the effluent reached the inlet pAH of 8.5. Samples of the effluent were taken periodically and analyzed for copper.

Following these steps water was passed through the tube section at a rate of 1 meter per second until samples of the effluent taken and analyzed indicated the copper concentration stabilized. This test simulates the start-up, the introduction of water to the cleaned condenser, the effluent approximating the composition of the plant start-up effluent during the period the water chemistry within the tubes is coming to equilibrium.

BRIEF DESCRIPTION OF DRAWINGS

A number of fouled tubes of various metallurgy were cleaned in the above manner and the results of the various analysis taken were illustrated graphically as in the drawings, FIGS. 1–5.

The data presented in the graphs illustrates that the copper content of the effluent from a recently cleaned condenser is markedly reduced by employing the procedures and the compositions of the present invention.

Figure 1:
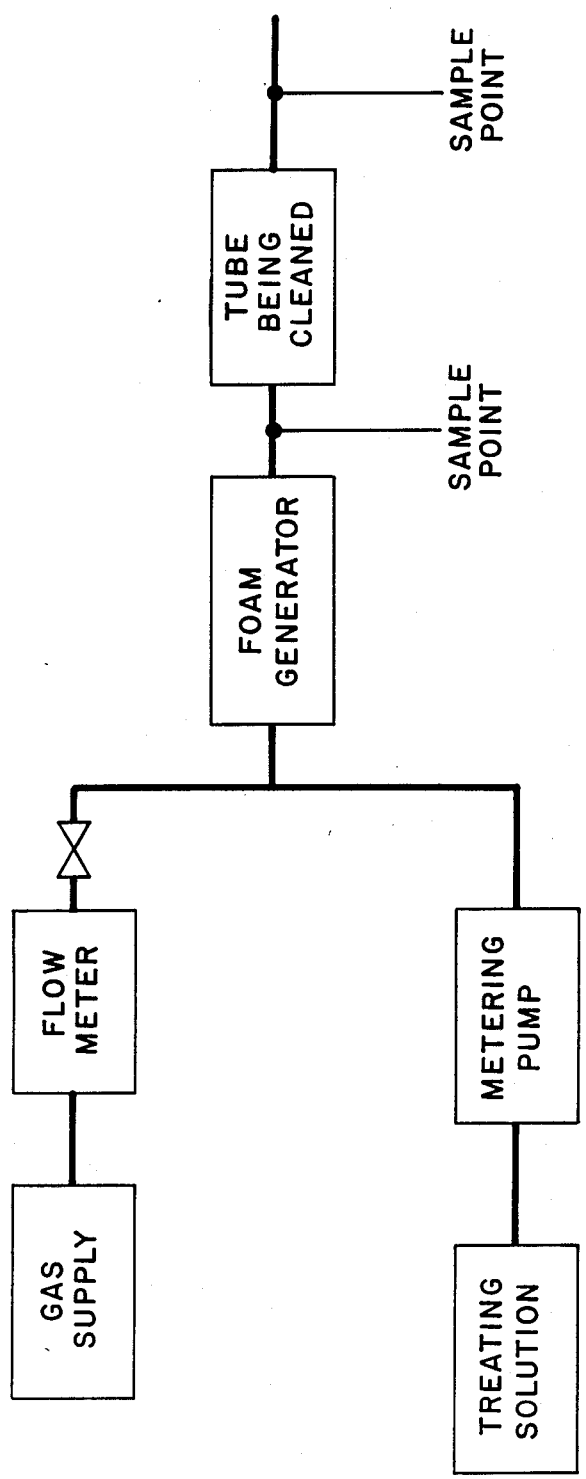
Figure 2:
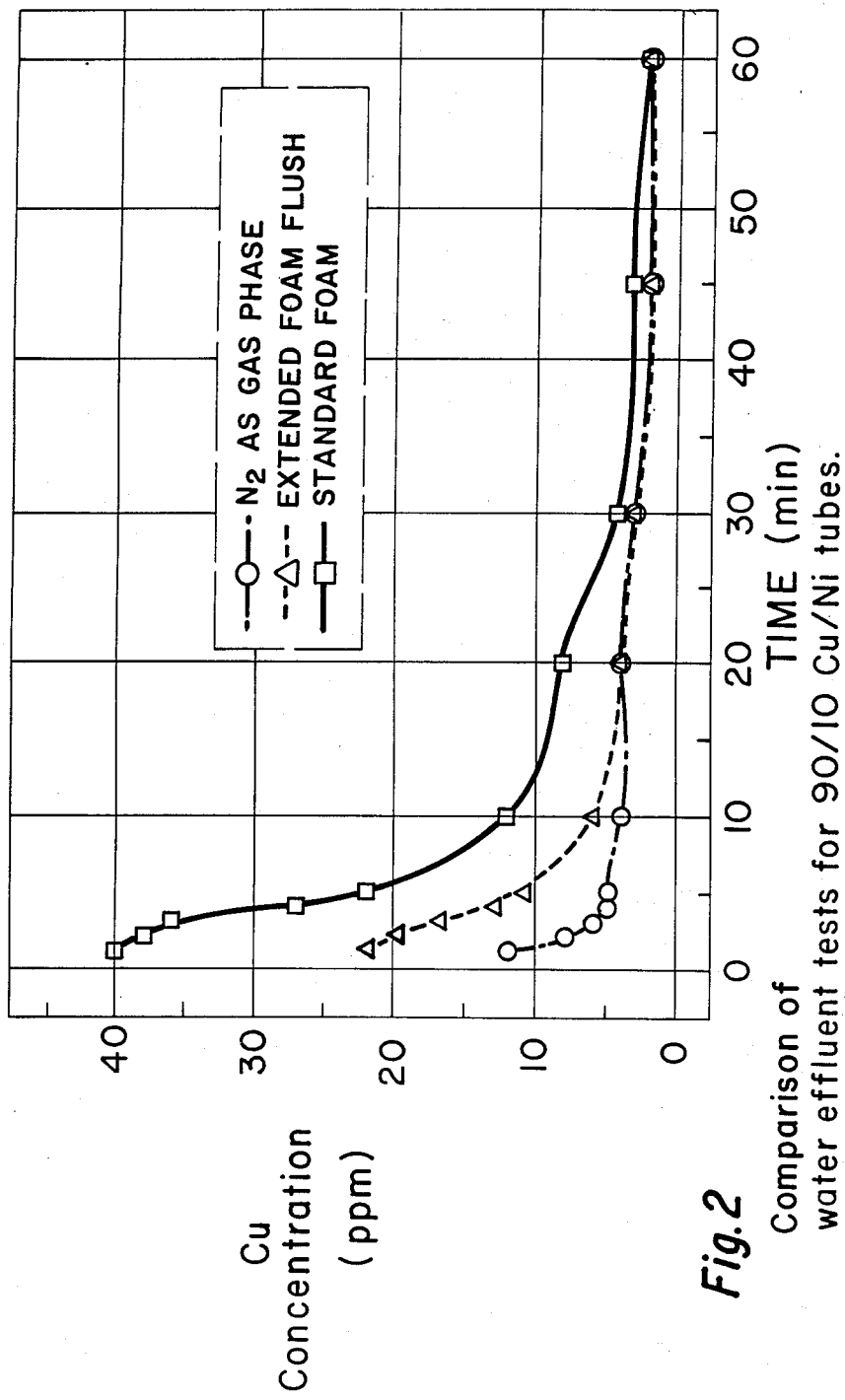
Figure 3:
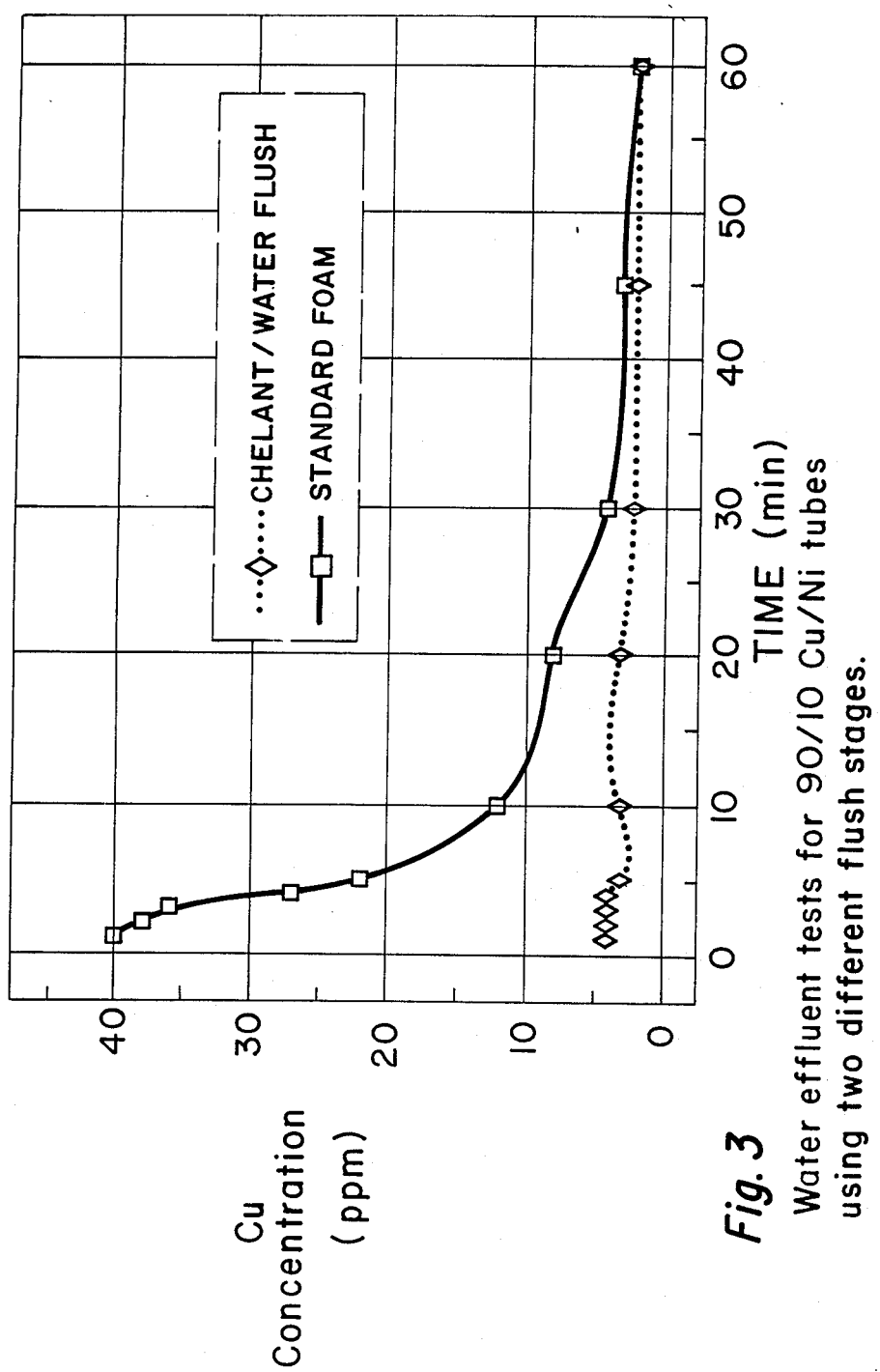
Figure 4:
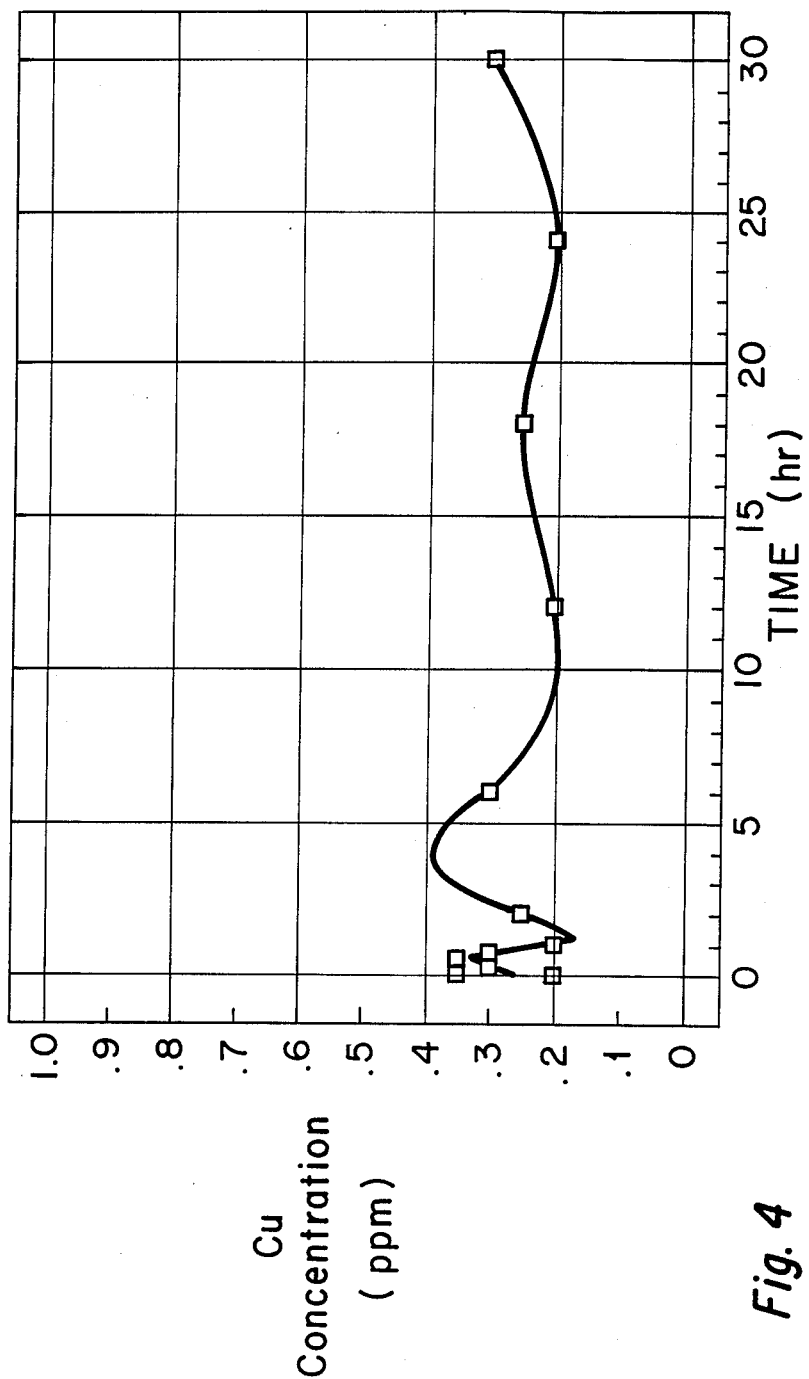
Figure 5:
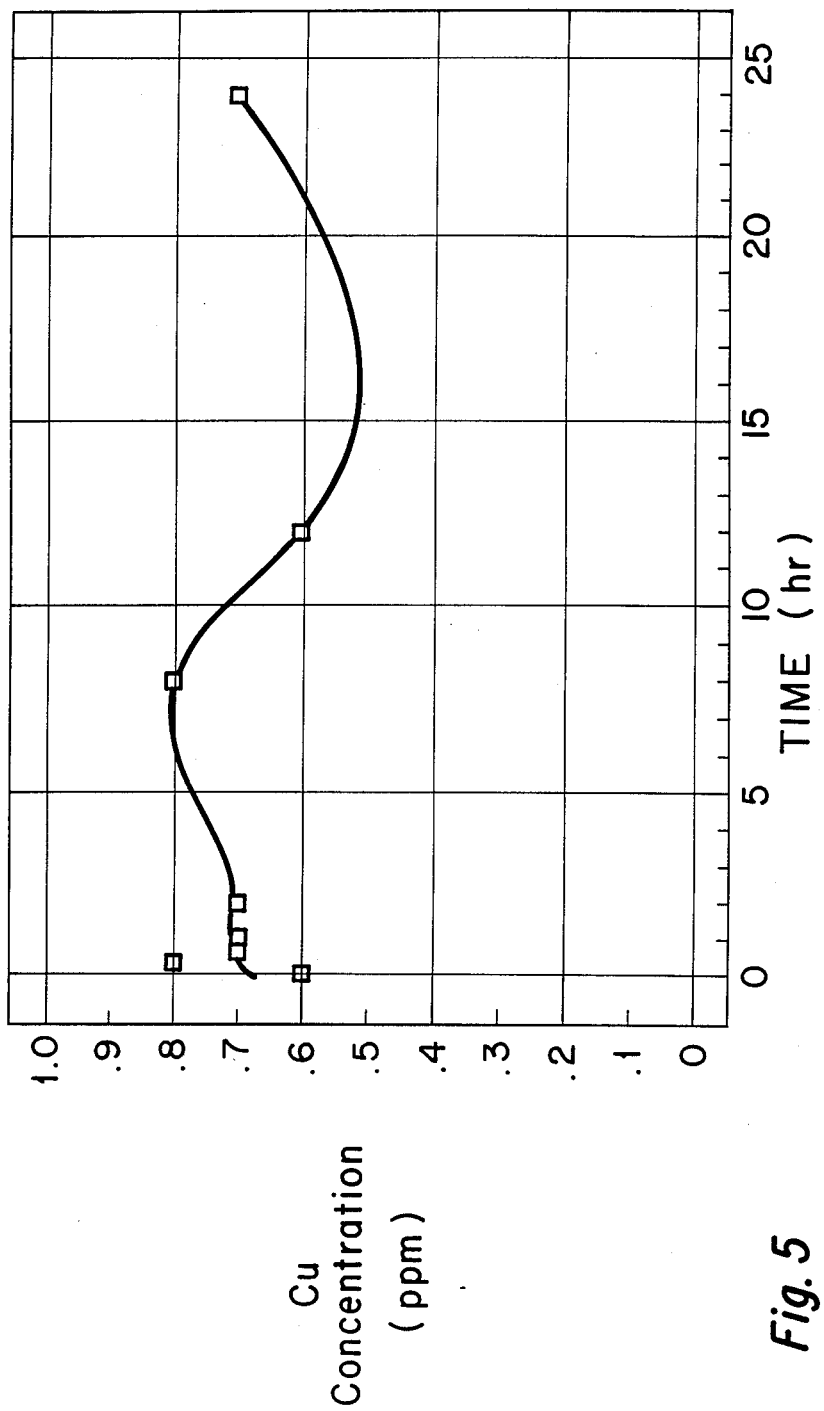

Small pieces were cut from the cleaned tubes and subjected to a stain test wherein the sections were hung in a humidity chamber and periodically visually inspected for staining. An indication of the degree of passivation is the time to and extent of visually observable staining of the metal surface which staining has been found to develop during the passivation of the copper under normal water chemistry equilibrium when the additives of the present inventiion were not included in the flush and neutralization formulations.

To illustrate the passivation effect of the neutralization composition over the previous conventional and commercial compositions and practices, referred to as Standard, the results of the visual inspections of the tube sections subjected to the high humidity stain tests following cleaning, flushing, neutralization and water flush are set forth in the Table 1.

TABLE 1

| | DAYS TO FIRST VISUAL STAIN | | |
|---|---|---|---|
| FOAM CLEANING TREATMENT | ADMIRALTY | METAL ALLOY 90/10 Cu/Ni | 70/30 Cu/Ni |
| 1. Standard with air as foaming gas no additives | 1 | 1 | 3 |
| 1a. Standard with N$_2$ as foaming gas no additives | 4 | 3 | 8 |
| 2. Standard with air as foaming agent followed by extended water flush* | 2 | 2 | 5 |
| 3. Standard w/air; (NH$_4$)$_2$EDTA added to water flush following cleaning/ flushing/neutralizing | 3 | 2 | 10 |
| 4. Present Invention | >21 | >21 | >21 |

The above table shows vividly that the use of both of the additives of the present invention, that is, the chelate in the acid flush step and the passivator/inhibitor in the neutralization step, unexpectedly reduce the copper level of the effluent over that obtained using the conventional systems and even over the conventional systems to which a chelate has been added to the "start-up water". Such data indicates that the tube surfaces are repassivated, at least temporarily, and the water chemistry equilibriums reestablished more rapidly without large cooper concentrations showing up in the effluent.

A series of field tests were undertaken cleaning large condensers associated with a steam generation plant at a utility company. The previous data indicated that the level of copper in the effluent from this once through condenser exceeded 1 ppm and occasionally excursioned to 72 ppm. which required all effluent water to be post treated before being discharged. However, following cleaning by the procedure of the present invention and using the afore described compositions, those containing the herein prescribed additives, $(NH_4)_2EDTA$ and 2-mercaptobenzotriazole, resulted in a copper content below 1 ppm in the start-up effluent.

In another field trial, a similar treatment was carried out on the condenser of a steam generating plant, but because of the turn-around schedule, the condenser was not to be put back into service for over three weeks following cleaning. This meant the cleaned tubes would be subjected to over three weeks exposure to a high humidity environment during that period, since shut-in was not feasible. Following the cleaning in accordance with the present invention, visual inspection showed the tubes were clean. A similar inspectiion three weeks later before tie-in was done showed no staining, indicating no corrosion. Analysis of the effluent start-up water likewise showed less than 1 ppm copper in the effluent.

These data show the capability of the present system to reduce the copper redeposition during acid flushing and the capability of passivation of, at least temporarily, the clean surface during neutralization, thereby reducing the copper pick-up during start-up and bringing the effluent of start-up waters within the allowable limits as regards copper. The system also allows a unit to remain ioff-line and open during periods of up to three weeks without any substantial corrosion and again provides a unit which can meet the allowable limits on copper in the effluent even after this three week period. One additonal advantage of the present system is that, according to the data, the neutralization and water-chemistry effluent copper contents reach the low point in a much shorter period of time than was observed in the prior commercial experience without the additives here described included in the formulations.

I claim:

1. A sequential process for removing deposits from water-side surfaces of copper alloy tubes employed in environments where thermal differentials occur the sequential steps consisting essentially of:
    (a) contacting the surfaces with an aqueous acid formulation including an inhibitor and a gas and a surfactant to effect foaming of the formulation;
    (b) flushing the surfaces with an aqueous flush solution including about 0.1 to about 1.0 percent by weight of a chelating agent for metals present in the deposits and having a pH between about 1 and about 5.5, and
    (c) neutralizing the surfaces with an aqueous neutralizing solution including an alkali metal salt of mercaptobenzotriazole present in an amount of from about 200 to about 1000 parts by weight per million parts by weight of the aqueous neutralizing solution, the neutralizing solution having a pH of from about 7 to about 8.5.

2. The process as set forth in claim 1 wherein said acid formulation, said aqueous flush solution and said aqueous neutralizing solution each include a gas and a surfactant and wherein each has a foam quality of 65 to 95.

3. The process as set forth in claim 1 wherein said step of flushing comprises flushing with an aqueous flush solution including a chelate selected from a group consisting of a polyalkylenepolyaminepolyacetic acid and an hydroxypolyalkylene polyaminepolyacetic acid.

4. The process as set forth in claim 1 wherein said step of flushing comprises flushing with an aqueous flush solution including a diammonium ethylenetriaminetetraacetic acid chelate and said step of neutralizing comprises neutralizing with an aqueous neutralizing solution including a sodium salt of 2-mercaptobenzotriazole.

5. The process as set forth in claim 1 wherein said step of flushing comprises flushing with an aqueous flush solution including a 2-hydroxyethyl ethylenediaminetriacetic acid and said step of neutralizing comprises neutralizing with an aqueous neutralizing solution including a sodium salt of 2-mercaptobenzotriazole.

* * * * *